United States Patent [19]
Kling et al.

[11] Patent Number: 5,342,910
[45] Date of Patent: Aug. 30, 1994

[54] PROCESS FOR PREPARING VINYLIDENE CHLORIDE OR VINYL CHLORIDE POLYMER BY SUSPENSION POLYMERIZATION

[75] Inventors: Susan M. Kling; Nitis Sarkar, both of Midland, Mich.

[73] Assignee: The Dow Chemical Company, Midland, Mich.

[21] Appl. No.: 993,217

[22] Filed: Dec. 18, 1992

[51] Int. Cl.⁵ .............................. C08F 4/12; C08F 2/20
[52] U.S. Cl. .................................. 526/195; 526/200; 526/233; 526/234; 526/296
[58] Field of Search ............... 526/195, 200, 233, 296

[56] References Cited

U.S. PATENT DOCUMENTS

| | | |
|---|---|---|
| 2,362,052 | 11/1944 | Craig . |
| 2,432,386 | 12/1947 | Craig . |
| 2,477,612 | 8/1949 | Irons . |
| 2,477,614 | 8/1949 | Irons . |
| 2,538,051 | 1/1951 | Schick . |
| 2,680,106 | 6/1954 | Havens . |
| 2,777,807 | 1/1957 | Pyle et al. . |
| 2,792,374 | 5/1957 | Bradley et al. . |
| 3,061,562 | 10/1962 | Grenley et al. . |
| 3,598,883 | 8/1971 | Nakamura et al. . |
| 3,862,066 | 1/1975 | Reiter et al. . |
| 4,399,273 | 8/1983 | Humme et al. . |
| 4,473,465 | 9/1984 | Veatch et al. . |
| 4,937,279 | 6/1990 | Betso et al. . |
| 5,084,500 | 1/1992 | Yamada et al. . |
| 5,086,079 | 2/1992 | Reese ................................. 526/233 |

OTHER PUBLICATIONS

Derwent Publications Ltd., 78347B/43, Mar. 9, 1978, Kureha Chem Ind KK.
Chem. Abstract, 31:5141(c), Craig, Mar. 14, 1950, U.S. 2,500,894.
Chem. Abstract, 30:21205(i), Kennedy et al., Aug. 26, 1958, U.S. 2,849,427.
Chem. Abstract, 31:17585(a), Stephan, Jul. 7, 1959, U.S. 2,893,883.

*Primary Examiner*—Christopher Henderson

[57] ABSTRACT

A process for preparing a polymer or copolymer from polymerizable monomers by suspension polymerization whereby foam formation during the removal of residual monomers is inhibited, which process comprises adding at least one salt of an inorganic acid having an anionic valency of at least 2 to the polymer slurry prior to the removal of the residual monomer.

13 Claims, No Drawings

PROCESS FOR PREPARING VINYLIDENE CHLORIDE OR VINYL CHLORIDE POLYMER BY SUSPENSION POLYMERIZATION

BACKGROUND OF THE INVENTION

This invention relates to a process for preparing polymers whereby foam formation during the removal of residual monomers is inhibited.

There are three common, general methods of polymerization. When a single monomer or a homogeneous mixture of two or more monomers is polymerized without a solvent or diluent, and as a single liquid phase, to form a solid polymeric block, the process is called "mass" or "homogeneous" polymerization. When one or more water-immiscible monomers and water-soluble catalyst or water-soluble initiators are dispersed in water by means of a "surface active" or emulsifying agent to form a latex-like dispersion of fine particles of the polymeric body, the process is called "emulsion" polymerization. The third process comprises mixing the monomers and water-immiscible and monomer soluble catalyst or initiators with water using a dispersing or suspending agent, and maintaining the dispersion or suspension by continued agitation at a temperature known to induce polymerization. The present invention relates to this third process, which is called "suspension" polymerization.

In the suspension process, starting monomers are suspended in an aqueous phase comprising a suspending agent and a polymerization initiator. Polymerization of the starting monomers is initiated and generally carried out in the presence of heat and agitation. Polymerization is allowed to continue until the desired degree of conversion of starting monomer to polymer is achieved. The resulting product, in the form of an aqueous suspension or dispersion, invariably contains a significant quantity of residual monomers and other volatile, non-monomeric impurities, such as organic solvents and the like. In many instances, it is desirable to remove substantially all of such residual monomers and impurities in the dispersion.

Conventionally, residual monomers have been removed by simply venting the reaction vessel, or by heating and/or reducing the pressure within the reaction vessel. However, during such removal of the residual monomers, severe foam formation occurs in the dispersion which makes the residual monomer removal a very slow process. Foaming also causes carryover of polymer solids into the vacuum system, causing plugging of process lines.

It would be desirable to provide a process for preparing a polymer whereby the formation of foam during the removal of residual monomers is inhibited.

SUMMARY OF THE INVENTION

This invention is a process for preparing a polymer or copolymer from polymerizable monomers by suspension polymerization whereby foam formation during the removal of residual monomers is inhibited, which process comprises:

(A) providing a polymerizable monomer mixture having an aqueous phase comprising a water-soluble suspending agent and a monomer phase comprising at least one suspension polymerizable monomer;

(B) polymerizing the polymerizable monomer to form a polymer slurry;

(C) adding at least one salt of an inorganic acid, preferably having an anionic valency of at least 2, to the polymer slurry in step (B);

(D) removing residual monomers from the polymer slurry in step (C); and (E) drying the slurry to form a polymeric composition.

The present process is useful for preparing polymers and copolymers by suspension polymerization whereby foam formation is inhibited during the removal of residual monomers. It is especially useful for inhibiting the formation of foam during the removal of residual monomers in the suspension polymerization of vinylidene chloride and/or vinyl chloride to form vinylidene chloride polymers and vinyl chloride polymers.

DETAILED DESCRIPTION OF THE INVENTION

Preferably, the polymers suitable for use in the present invention are (1) the vinylidene chloride polymers prepared from a vinylidene chloride monomer or a monomer mixture comprising a major amount of a vinylidene chloride monomer and a minor amount of ethylenically unsaturated comonomer(s) copolymerizable therewith and (2) the vinyl chloride polymers prepared from a vinyl chloride monomer or a monomer mixture comprising a major amount of a vinyl chloride monomer and a minor amount of ethylenically unsaturated comonomer(s) copolymerizable therewith.

The terms "vinylidene chloride polymer" and "vinyl chloride polymer" encompass homopolymers, copolymers, terpolymers, etc., of vinylidene chloride and vinyl chloride, respectively.

For vinylidene chloride polymers, an effective amount of polymerized vinylidene chloride monomer is generally in the range of from about 60 to about 100 percent by weight of polymer.

For vinyl chloride polymers, an effective amount of polymerized vinyl chloride monomer is generally in the range of from about 60 to about 100 percent by weight of polymer.

Suitable ethylenically unsaturated monomers copolymerizable with the vinylidene chloride monomer or vinyl chloride monomer include vinyl chloride or vinylidene chloride, respectively, and other monomers such as alkyl acrylates, alkyl methacrylates, acrylic acid, methacrylic acid, itaconic acid, acrylonitrile and methacrylonitrile. The alkyl acrylates and alkyl methacrylates are generally selected to have from about 1 to about 8 carbon atoms per alkyl group. Preferably, alkyl acrylates and alkyl methacrylates are selected to have from about 1 to about 4 carbon atoms per alkyl group. The alkyl acrylates and alkyl methacrylates are most preferably selected from the group consisting of methyl acrylate, ethyl acrylate and methylmethacrylate.

Suitable water-soluble suspending or dispersing agents include, but are not limited to, the water-soluble alkyl or hydroxyalkyl alkyl cellulose ethers wherein the alkyl group contains from 1 to 6 carbon atoms and the hydroxyalkyl groups contain from 2 to 4 carbon atoms, and mixtures thereof. Examples of such water-soluble suspending or dispersing agents are cellulose ethers such as methyl cellulose, carboxymethylcellulose, methylcarboxymethylcellulose, methylcarboxyethylcellulose, hydroxyethylcarboxymethylcelulose, ethylhydroxyethylcellulose, hydroxypropylmethylcellulose, and the like. Cellulose ethers are well known in the art and are prepared by reacting an alkali cellulose and a mixture of methyl chloride and propylene oxide. The resulting cellulose ether product contains an amount of methoxyl groups in the usual range to provide solubility in water, i.e., from 16 to 35 percent methoxyl content, and a relatively smaller amount of hydroxypropyl substituents in the molecule, representing from 0.05 to 2 such groups per anhydroglucose unit to affect the gel point of aqueous solutions of the cellulose ether. Any viscosity grade of the cellulose ethers may be used. By viscosity grade as herein used is meant the viscosity of a 2 percent aqueous solution of the cellulose ether measured at 20° C. using a Ubbelohde capillary tube of suitable dimensions. Preferably, the cellulose ether has a viscosity of from about 3 to about 300,000 centipoises (cps).

The water-soluble suspending agent is used in an amount of from about 0.001 weight percent to about 1 weight percent, preferably from about 0.05 to about 0.1 weight percent, based on the weight of the monomer.

Suitable initiators contemplated for use in the present invention include, but are not limited to, the peroxides, such as hydrogen peroxide, isopropyl peroxypercarbonate, lauroyl peroxide, tert-butyl hydroperoxide; the azo compounds such as 2,2′azobisisobutyronitrile, and mixtures thereof.

Preferably, the initiator is used in an amount of from about 0.01 to about 1.0, more preferably, from about 0.1 to about 0.7 and, most preferably, from about 0.2 to about 0.5 weight percent, based on the weight of the monomer.

The salt of inorganic acid, hereinafter called "inorganic acid salt," is soluble in water at the concentration of use. Solubility will be affected by temperature, pressure, pH and other species in the composition. These factors are known to those skilled in the art and their effect upon this invention may be readily determined without undue experimentation.

Suitable inorganic acid salts include alkali and alkaline earth metal phosphates, alkali and alkaline earth metal borates, alkali and alkaline earth metal carbonates, alkali and alkaline earth metal bicarbonates, alkali and alkaline earth metal hydrogen phosphides, and mixtures thereof. Also suitable are the ferric salts and aluminum salts of boric acid, phosphoric acid, carbonic acid, sulfuric acid, polyphosphoric acid, hydrophosphoric acid and pyrophosphoric acid. Preferred inorganic acid salts are tetrasodium pyrophosphate, sodium hypophosphate, sodium pyrophosphate, sodium orthophosphate, sodium polyphosphate, potassium hypophosphate, potassium pyrophosphate, potassium orthophosphate, potassium polyphosphate and mixtures thereof. Most preferred inorganic acid salt is tetrasodium pyrophosphate.

The inorganic acid salts suitable for purposes of the present invention are prepared by processes well-known in the art. By way of illustration only, techniques for preparing tetrasodium pyrophosphate are set forth in The Merck Index, 10th Edition (1983), which is hereby incorporated by reference.

The inorganic acid salt is used in an amount of from about 0.001 to about 5 weight percent, preferably from about 0.0015 to about 3 weight percent, more preferably from about 0.01 to about 1.5 weight percent, and, most preferably, from about 0.02 to about 0.5 weight percent, based on the weight of the monomer mix.

Preparation of vinylidene chloride polymers and vinyl chloride polymers by suspension polymerization is well known in the art. Except as specifically set forth herein, polymerization conditions (e.g., temperature and agitation) are those conventionally employed in the polymerization of vinylidene chloride or vinyl chloride. Advantageously, in preparing the aqueous phase, about three-fourths of the water required for the polymerization is added to the reactor prior to the addition of the initiators, plasticizers and other suitable additives, such as, for example, chelating agents and antioxidants. This order of addition of the aqueous phase ingredients helps maintain a monomer-in-water suspension polymerization.

Typically, when the monomer is added to the aqueous phase (monomer-in-water phase), the mixture is heated with agitation, in the substantial absence of oxygen, to a temperature of between about 25° C. and 95° C. for a period sufficient to provide the desired conversion of monomer to polymer. The conversion of monomer to polymer is generally between about 50 and 99 percent.

After polymerization is complete, an aqueous suspension or slurry of the polymer or copolymer is formed. To form a monomer-free slurry, residual monomer is preferably removed first by venting the reactor to atmospheric pressure while heating the reactor to 95° C. The slurry is then transferred to a batch stripper where the remaining residual monomer is vacuum-stripped at 90° C. During the venting of the reactor, mechanical transferring of the slurry to the stripper and vacuum-stripping of the residual monomer, the suspending agent that is still in solution and surface active increases the formation of foam and also stabilizes the foam by surface gelation. It is this stabilized foam that carries resin over into knockout pots, transfer lines and waste pits.

Surprisingly, it has been found that adding at least one inorganic acid salt to the polymer slurry before the removal of the residual monomer, inhibits foam formation. Although not intended to be bound by theory, it is believed that the inorganic acid salt lowers the gelation temperature of the suspending agent which, in turn, precipitates the suspending agent and makes it unavailable for increasing the formation of foam and for stabilizing the foam. "Gelation temperature" is discussed in the article "Thermal Gelation Properties of Methyl and Hydroxypropyl Methylcellulose", N. Sarkar, *Journal of Applied Polymer Science*, Vol. 24, 1073–1087 (1979), incorporated herein by reference.

If the polymer prepared by the process of the present invention is vinylidene chloride polymer, the inorganic acid salt also neutralizes any hydrogen chloride formed by dehydrochlorination of the vinylidene chloride monomer during polymerization.

The inorganic acid salt can be added to the polymer slurry in solid form or in the form of a dilute aqueous solution. It can be added either to the polymerization reactor before transferring the polymer slurry to the monomer stripper vessel, or to the monomer stripper vessel as the polymer slurry is being heated to a temperature sufficient to vacuum-strip the residual monomer.

After the removal of residual monomer, the slurry is cooled down, unloaded to a centrifuge for dewatering and the polymer is collected and further dried.

Although the invention is specifically described with respect to the preferred embodiment, that is, the suspension polymerization process for preparing vinylidene chloride and vinyl chloride polymers, the present process is also applicable to the preparation of other polymers prepared from monomers such as acrylic esters, styrene and divinylbenzene, vinyl acetate, tetrafluoroethylene, chlorotrifluoroethylene and copolymers thereof with other unsaturated monomers.

The present invention is illustrated in further detail by the following examples. The examples are for the purposes of illustration only, and are not to be construed as limiting the scope of the present invention. All parts and percentages are by weight unless otherwise specifically noted.

EXAMPLE 1

A polymeric composition is formed from a monomer mixture through a suspension polymerization process. Into a 10,000 gallon agitator-stirred polymerization reactor is loaded 33,000 pounds of demineralized water, 140 pounds of tert-butylperoctoate (t-BPO), 2 pounds of butyl hydroxy toluene (BHT), and 564 pounds of a 3% solution of tetrasodium pyrophosphate (TSPP) for pH control by neutralizing the HCL produced by the dehydrochlorination of the vinylidene chloride monomer during polymerization. To the stirred mixture in the reactor is added 3235 pounds of methyl acrylate (MA) and 34450 pounds of vinylidene chloride (VDC) monomer. The agitator is stopped after which 4300 pounds of approximately 1% METHOCEL ™ cellulose ether solution and 10,200 pounds of demineralized water are added. Agitation is resumed to form the organic-in-water suspension and produce monomer droplets. The MA/VDC monomer mix is vented throughout the loading steps to minimize the presence of inerts and oxygen in the reactor. The reactor is heated to a temperature of about 73° C. After polymerization has begun, the temperature is raised to 86° C. and polymerization is allowed to continue for about eight hours.

The MA/VDC residual monomer recovery process begins with a vent step. The reactor pressure is initially vented down to about 30 psig over 30 minutes and the vent rate is controlled to minimize foaming. During the initial vent, the reactor contents are heated from 80° C. to about 95° C. Upon completion of the initial vent, the reactor contents are pumped to a 15,000 agitated stripper vessel. About 1450 pounds of 3% TSPP solution is added to the reactor as the polymer slurry is being transferred to the stripper vessel. By the time everything has been transferred to the stripper, the temperature has cooled back to 80° C., but direct injection of steam reheats the stripper contents to the boiling point and continued steam addition establishes an equilibrium boil-up rate to drive off monomer. In addition, a flow of 35–45 lb/hr of nitrogen sparge and 8–10 psia vacuum aids the stripping operation. No foam formation is observed during the stripping operation.

COMPARATIVE EXAMPLES A AND B

In Comparative Example A, a polymeric composition is prepared as in Example 1, except that the 1450 pounds of 3% TSPP solution is not added to the reaction slurry during the stripping stage. In Comparative Example B, the same method is followed as in Example 1, except that the 1450 pounds of 3% TSPP solution is added to the polymer slurry after the removal of the residual monomers. In both cases, unacceptable level of foam formation is observed.

What is claimed is:

1. A process for preparing a vinylidene chloride polymer or vinyl chloride polymer from polymerizable monomers by suspension polymerization whereby foam formation during removal of residual monomers is inhibited which comprises:

(A) providing a polymerizable monomer mixture having an aqueous phase comprising a suspending agent and a monomer phase comprising at least one suspension polymerizable monomer;

(B) polymerizing the polymerizable monomer mixture to form an aqueous slurry of polymer and residual monomer;

(C) adding at least one salt of an inorganic acid having an anionic valency of at least 2 to the polymer slurry formed after polymerization of the monomer mixture in step (B);

(D) removing the residual monomer from the polymer slurry containing the salt of an inorganic acid in step (C); and (E) drying the slurry to form a dry polymer or copolymer.

2. The process of claim 1 wherein step (D) comprises subjecting the polymer slurry to a vacuum to flash out the residual monomer.

3. The process of claim 1 wherein the or dispersing suspending or dispersing agent is selected from the group consisting of methyl cellulose and hydroxypropyl methyl cellulose.

4. The process of claim 1 wherein the vinylidene chloride polymer is prepared from a vinylidene chloride monomer or a mixture of vinylidene chloride and at least one other monomer selected from the group consisting of vinyl chloride, alkyl acrylates, alkyl methacrylates, acrylic acid, methacrylic acid, itaconic acid, acrylonitrile and methacrylonitrile.

5. The process of claim 1 wherein the vinyl chloride polymer is prepared from a vinyl chloride monomer or a mixture of vinyl chloride and at least one other monomer selected from the group consisting of vinylidene chloride, alkyl acrylates, alkyl methacrylates, acrylic acid, methacrylic acid, itaconic acid, acrylonitrile and methacrylonitrile.

6. The process of claim 1 wherein the inorganic acid salt is present in an amount of from about 0.001 to about 5 weight percent, based on the weight of total monomer mix.

7. The process of claim 6 wherein the inorganic acid salt is present in an amount of from about 0.005 to about 3 weight percent, based on the weight of total monomer mix.

8. The process of claim 7 wherein the inorganic acid salt is present in an amount of from about 0.01 to about 1.5 weight percent, based on the weight of total monomer mix.

9. The process of claim 8 wherein the inorganic acid salt is present in an amount of from 0.02 to 0.5 weight percent, based on the weight of total monomer mix.

10. The process of claim 1 wherein the inorganic acid salt is selected from the group consisting of alkali or alkaline earth metal phosphates, alkali or alkaline earth metal borates, alkali or alkaline earth metal carbonates, alkali or alkaline earth metal bicarbonates, alkali or alkaline earth metal hydrogen phosphides, and mixtures thereof.

11. The process of claim 1 wherein the inorganic acid salt is selected from the group consisting of the ferric salts, ammonium salts, lithium salts and aluminum salts of inorganic acids which are boric acid, phosphoric acid, carbonic acid, sulfuric acid, polyphosphoric acid, hypophosphoric acid and pyrophosphoric acid.

12. The process of claim 1 wherein the inorganic acid salt is selected from the group consisting of tetrasodium pyrophosphate, sodium hypophosphate, sodium pyrophosphate, sodium orthophosphate, sodium polyphosphate, potassium hypophosphate, potassium pyrophosphate, potassium orthophosphate, potassium polyphosphate and mixtures thereof.

13. The process of claim 1 wherein the or dispersing suspending or dispersing agent is selected from the group consisting of the water-soluble alkyl or hydroxyalkyl alkyl cellulose ethers wherein the alkyl group contains from I to 26 carbon atoms and the hydroxyalkyl groups contain from 2 to 4 carbon atoms, and mixtures thereof.

* * * * *

UNITED STATES PATENT AND TRADEMARK OFFICE
CERTIFICATE OF CORRECTION

PATENT NO. : 5,342,910
DATED : August 30, 1994
INVENTOR(S) : Susan M. Kling and Nitis Sarkar It is certified that error appears in the above-indentified patent and that said Letters Patent is hereby corrected as shown below:

Column 6, line 20, delete "or dispersing".
Column 6, line 21, delete "or dispersing".
Column 7, line 5, delete "or dispersing".
Column 7, line 6, delete "or dispersing".
Column 8, line 3, "I" should read —1—.

Signed and Sealed this

Seventh Day of November, 1995

Attest:

BRUCE LEHMAN

Attesting Officer   Commissioner of Patents and Trademarks